Sept. 5, 1967     C. H. EGGLETON, JR     3,339,872
LOCKING MEANS FOR UPPER SUSPENSIONS
Filed Aug. 27, 1965
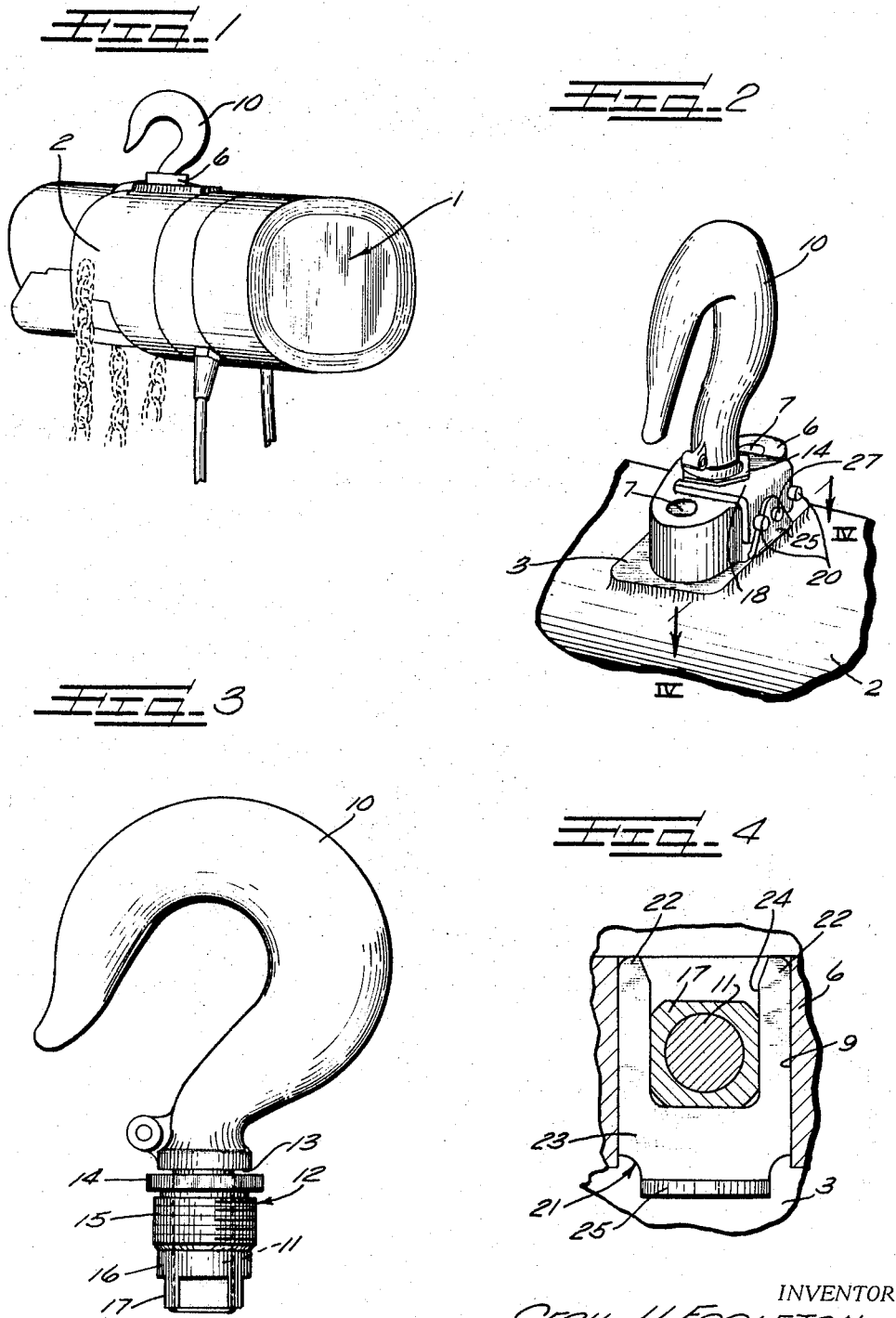
INVENTOR.
CECIL H. EGGLETON JR.
BY *Hill, Sherman, Meroni, Gross & Simpson*     ATTORNEYS Sept. 5, 1967   C. H. EGGLETON, JR   3,339,872
LOCKING MEANS FOR UPPER SUSPENSIONS
Filed Aug. 27, 1965   2 Sheets-Sheet 2
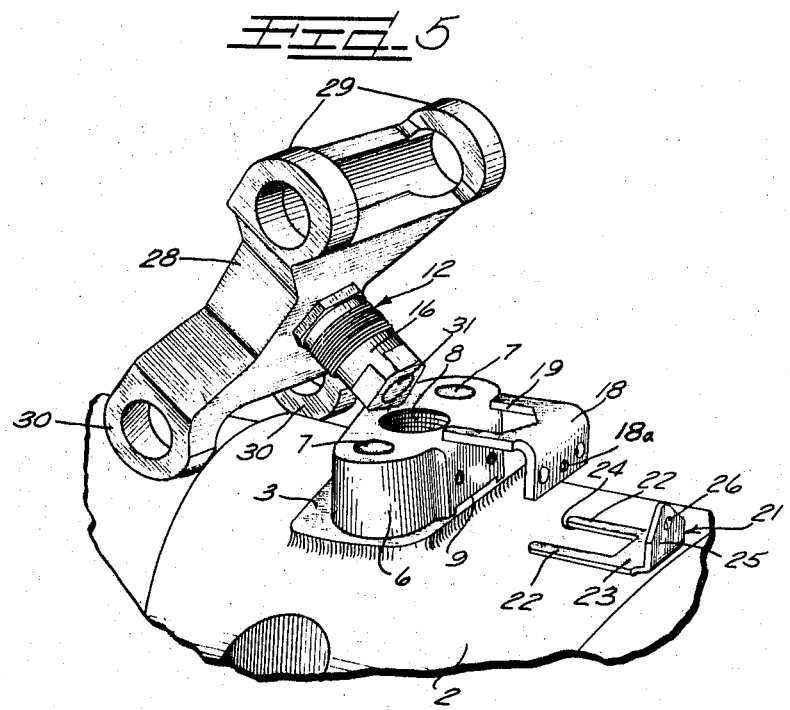
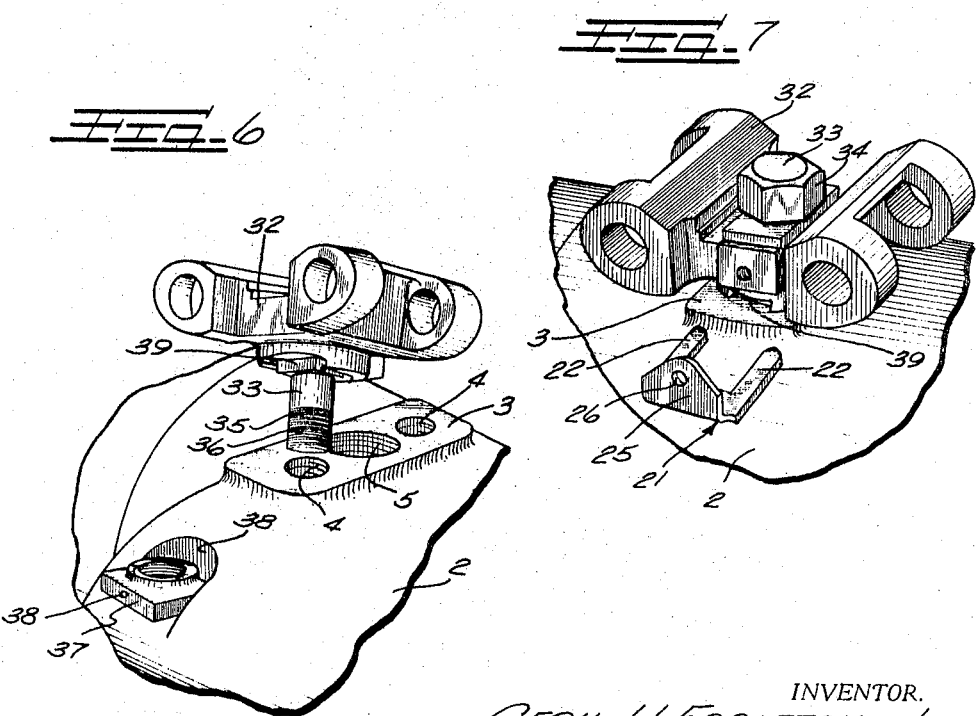
INVENTOR.
CECIL H. EGGLETON JR.
BY Hill, Sherman, Meroni, Gross & Simpson   ATTORNEYS United States Patent Office 3,339,872
Patented Sept. 5, 1967

3,339,872
LOCKING MEANS FOR UPPER SUSPENSIONS
Cecil H. Eggleton, Jr., Fruitport, Mich., assignor to Dresser Industries, Inc., Dallas, Tex., a corporation of Delaware
Filed Aug. 27, 1965, Ser. No. 483,287
7 Claims. (Cl. 248—324)

This invention relates to improvements in locking means for upper suspensions, and more particularly to upped suspension assemblies which may selectively be of the hook type or of the lug suspension bracket type equipped with locking means to assure rigid positioning of the load carried by the suspension means relatively to the suspension means, the invention being highly desirable for use in the suspension of portable hoists, overhead sheave assemblies, and other overhead apparatus, as will be apparent to one skilled in the art.

In the past, various types of suspension assemblies for overhead apparatus have been developed for supporting the apparatus from a main support such as a trolley riding the lower flange of an I-beam. These formerly known suspension assemblies, while capable of connecting an overhead apparatus to a main support, have proven unsatisfactory in many ways. In some instances there was nothing to prevent rotation of the apparatus relatively to the suspension assembly or main support. In many cases the apparatus could not be locked and maintained at a desired angle in regard to the suspension assembly. Certain of these suspension assemblies heretofore made were provided with means for rigidly positioning the apparatus at a desired angle to the suspension assembly, such as cross mounting or parallel mounting, but in order to change the mounting when desired, the apparatus had to be removed from the main support and at least partially disassembled and again assembled in the newly selected angular position. Furthermore, such previously known locking means were so embodied in the load bearing structure that wear upon the locking means adversely affected the strength of the suspension means. In short, selectivity of position, rigid holding of the apparatus in the selected position, ease of changeover to a new position, and lack of wear on load bearing parts were not satisfactorily available in suspension assemblies of the types heretofore known.

With the foregoing in mind, it is an important object of the instant invention to provide a suspension assembly for overhead apparatus equipped with a simple form of locking means which provides rigid positioning of the apparatus relatively to the suspension assembly in a plurality of selective angularly positions, and whereby the locking means may be readily and easily removed to permit free rotation of the overhead apparatus, if desired.

Also an important object of this invention is the provision of a suspension assembly for holding overhead apparatus, which assembly is provided with simple means for rigidly positioning the apparatus at a desired angular position with respect to the assembly, and such positioning may be accomplished or changed at will without removing the apparatus or suspension assembly from the main support, and without partially disassembling the apparatus.

Another object of the invention is the provision of a suspension assembly to carry overhead apparatus, the assembly being equipped with simple locking means to maintain the apparatus at a desired angular relationship to the assembly, which locking means are totally incidental to load bearing parts so that wear upon the locking means does not adversely effect the strength of the suspension assembly.

Still another desideratum of this invention is the provision of a suspension assembly for carrying overhead apparatus, the assembly being equipped with locking means to maintain the apparatus at a desired angular relationship to the assembly, and which locking means perform the additional function of providing assurance that another important part of the assembly is in proper position.

It is also a feature of this invention to provide a suspension assembly for overhead apparatus, the assembly embodying locking means to maintain the apparatus at a desired angular adjustment relatively to the assembly, and which assembly may be extremely economically manufactured, and the locking means are exceedingly simple to adjust.

While some of the more salient features, characteristics and advantages of the instant invention have been above pointed out, others will become apparent from the following disclosures, taken in conjunction with the accompanying drawings, in which:

FIGURE 1 is a perspective view of a portable electric hoist equipped with a hook suspension assembly embodying principles of the instant invention;

FIGURE 2 is a fragmentary view of the upper central portion of FIGURE 1 illustrating the hook assembly in a different angular position relative to the hoist;

FIGURE 3 is an enlarged elevational view of the hook alone;

FIGURE 4 is an enlarged plan sectional view taken substantially as indicated by the line IV—IV of FIGURE 2;

FIGURE 5 is an exploded fragmentary perspective view of a lug suspension bracket assembly embodying principles of the instant invention;

FIGURE 6 is a fragmentary exploded perspective view of a different form of lug suspension bracket assembly; and FIGURE 7 is a fragmentary perspective view of the structure of FIGURE 6 just before attachment of the locking means.

As shown on the drawings:

Since the instant invention is adaptable to both hook suspension assemblies and lug suspension bracket assemblies, both forms have been shown in the drawings. As stated above, while various forms of overhead apparatus may be carried by suspension assemblies of this character, by way of example and not by way of limitation, the instant invention will be herein described in association with the carrying of a portable electric hoist, generally indicated by numeral 1.

The hoist 1 embodies a frame 2 on the upper side of which an integral pillow formation 3 is provided which formation has a pair of like threaded openings 4—4, and a larger intermediate threaded opening 5 therein, as best seen in FIGURE 6.

With certain types of suspension assemblies, it is desirable to provide an upper block 6 on the pillow 3 as best seen in FIGURES 2, 4, and 5. This upper block is apertured to accommodate bolts 7—7 by means of which the block is secured to the pillow, these bolts entering the threaded openings 4—4 in the pillow. The upper block is also provided with a larger central threaded opening 8, FIGURE 5, and beneath this threaded opening 8 a notch or slot 9 is provided in the block extending crosswise therethrough as best seen in FIGURE 4. This slot 9 accommodates a locking clip to be later described.

The hook suspension assembly seen in FIGURES 1 to 4 inclusive comprises a hook 10 having an integral stud 11 of reduced diameter depending therefrom. A bushing, generally indicated by numeral 12, is floatingly mounted upon the stud 11 beneath a shoulder 13 on the hook at the top of the stud, and the bushing is free to rotate relatively to the stud. As seen clearly in FIGURE 3, the bushing is provided with a polygonal head 14 at its upper end below which is an externally threaded hollow shank 15 for engagement in the aforesaid threaded aperture 8 in the upper block 6 to attach the hook assembly to the hoist frame 2. Below the bushing, a nut 16 having a polygonally shaped lower end 17, square in the illustrated instance, is firmly secured to the stud 11, such as by welding.

When the bushing is firmly threaded into the aperture 8 of the upper block 6 an angular bushing lock 18 is placed in position. As seen best in FIGURE 5, this bushing lock has a recess 19 in its upper leg shaped complementally to the polygonal head 14 of the bushing. The bushing lock is merely slid into position over the top of the upper block 6 until a portion of the head 14 is received in the notch 19 and then the lock is anchored firmly in position by means of screws or bolts 20—20, FIGURE 2, both the bushing lock and the upper block being suitably apertured and tapped for such bolts. With the bushing lock firmly in place, the bushing is held against rotation relatively to the hoist frame 2.

Thereafter, an angular locking clip, generally indicated by numeral 21, is slid into the slot 9 at the bottom of the block 6. As seen best in FIGURES 4 and 5, this clip 21 is provided with a pair of spaced legs 22—22 defining along with the base 23 of the clip a notch 24 complemental to the shape of the polygonal lower end 17 of the fixed nut 16, as clearly seen in FIGURE 4. The clip also has an outer upstanding part 25 apertured as at 26 to accommodate a screw or bolt 27, as seen in FIGURE 2, this bolt 27 extending through the portion 25 of the clip, into a tapped opening 18a in the depending portion of the bushing lock 18. When the clip 21 is so positioned, the hoist frame is rigidly held against rotation relatively to the hook. In addition to locking the hoist frame and hook against relative rotation, the clip 21 also performs the function of providing assurance that the bushing lock 18 is in its proper operative position since the screw 27 must be tightened in the bushing lock to mount the clip 21.

It will also be noted that since the clip 21 is entirely incidental to load bearing parts of the suspension assembly, wear on the clip will have no effect whatever upon the strength of the suspension assembly.

With the present invention, the angular relation of the hoist with respect to the hook may be varied whenever desired with extreme ease. No disassembly of any of the load bearing parts is necessary or no disassembly of any portion of the hoist is required, and the hook need not be removed from the main support such as a trolley on an overhead track. It is simply necessary to remove the bolt 27 and slide the clip out of the slot 9 in the upper block 6. The bushing locking clip 18 remains in place and the hoist is free to rotate relatively to the hook by virtue of the floating bushing 12. When the desired new position of the hoist relatively to the hook is acquired, the clip 21 is merely placed back into position and the bolt 27 replaced. Thus a change in relative position between the hoist and hook can be accomplished in an extremely small time and with little effort.

In order to ultimately save costly labor and waste of time, with the instant invention it is not necessary to predetermine whether the suspension means are to be parallel mounted or cross mounted with respect to the hoist. It is a simple expedient to change mountings even after the hoist is suspended from the main support so that the hoist may be previously hung, and then the particular angularity of the hoist desired relative to the suspension means may be determined and the adjustment readily made.

The angular relationship of the hoist to the suspension means may be varied throughout all workable positions. In FIGURE 1, the hook is parallel mounted, while in FIGURE 2 the hook is cross mounted. The parallel mounting may readily be reversed by removing the clip 21 and rotating the hoist 180° and replacing the clip. Likewise the cross mounting may similarly be reversed so that the hook opening is facing the opposite side of the hoist. As will later appear the same ease of adjustability is obtainable in the same way with a lug suspension bracket type of supporting means.

With reference now to FIGURE 5, it will be seen that a bracket 28 carries a pair of spaced apertured lugs 29—29 on one side thereof and a similar set of lugs 30—30 on the opposite side thereof. Each pair of lugs accommodates a through bolt by means of which the bracket is rigidly connected to the under structure of a trolley or other main support. A stud 31, which may be integral with the bracket, depends from the central portion thereof. This stud is the same in all respects as the stud 11 above described in connection with the hook 10. Floating on this stud so as to be freely rotatably with respect thereto, is the same bushing 12 above described, and the same securing nut 16 as above described is firmly secured to the lower end of the stud. The same bushing locking clip 18 is utilized and the same locking clip 21 is also utilized, both in identically the manner as above described. Consequently, the operation is the same in changing the angular relationship of the hoist to the lug suspension bracket as above described in connection with the hook, and it is not necessary to disconnect the lug suspension bracket from the trolley during the change over to a new relative position of angularity.

With both the hook or the lug suspension bracket assemblies, the angular position of the hoist relative to the suspension means may be altered even when the hoist is carrying a load, should occasion warrant an adjustment at that time.

In FIGURES 6 and 7 I have illustrated a construction which may be used upon hoists of lower capacities, for example one ton or less load capacity. In this instance, it is not necessary to utilize the upper block 6, and a lug bracket 32 of the general character as above described is seated directly on the pillow 3 of the hoist frame 2. A stud 33 in the form of a bolt extends through the bracket and is connected with the bracket by means of a suitable nut 34 as seen in FIGURE 7. This stud has a lower threaded end 35, and a diametral aperture 36 is provided to accommodate a roll pin. In order to anchor the stud with the hoist frame, a square nut 37 is placed in a lateral groove 38 in the hoist frame and moved to a position beneath the opening 5 in the pillow. This nut is also provided with a transverse aperture 38 for the accommodation of a grooved pin. When the threaded end 35 of the stud is engaged in the nut 37 and a grooved pin inserted through the apertures 38 and 36, the hoist frame cannot rotate relatively to the stud, since the width of the groove 38 in the hoist frame is not sufficient to permit any rotation of the nut 37.

Rotation of the lug bracket 32 relatively to the stud, or vice versa, is prevented by the use of a clip 21 as above described. It will be noted that the stud is provided with a polygonal flange 39, square in the illustrated instance, immediately adjacent the under side of the lug bracket, as seen in FIGURE 6. When the lug bracket is seated on the pillow 3 and the parts connected, it is a simple expedient to slip the clip 21 into place with its legs or prongs 22—22 engaged with opposite faces of the shoulder 39, and the clip secured by means of a bolt 27, there can be no relative rotation between the lug bracket and the stud. Accordingly, the hoist is held rigidly in a desired angular relationship with the suspension bracket. This angular relationship may be changed at will by the simple expedient of removing the clip 21, turning the hoist to the desired angle, and replacing the clip, in the manner previously set forth herein.

From the foregoing, it is apparent that I have provided suspension means for overhead apparatus embodying a simple form of locking clip, whereby the angular relationship between the apparatus and suspension means may be altered at any time in an extremely simple and economical manner. Obviously, any desired amount of rotation of the suspended hoist may be had at any time by simply removing the locking clip 21 from the suspension assembly. It will also be noted that the suspension assembly is extremely economical to manufacture, is long lived, and wear on the locking clip cannot adversely affect the strength of the load bearing part.

It will be understood that modifications and variations may be effected without departing from the scope of the novel concepts of the present invention.

I claim as my invention:

1. A suspension assembly for overhead apparatus,
a carrying member shaped for engagement with a main overhead support,
an upper block rigidly attachable to the top of the apparatus to be suspended,
said block having a transverse slot therein,
a stud depending from said carrying member and extending into said block transversely past the region of said slot,
a clip slidable in said slot into engagement with said stud in a manner to prevent relative rotation therebetween while being substantially load-free of the suspension load imposed by the apparatus when suspended, and
means for removably securing said clip to said block.

2. In a suspension assembly for overhead apparatus,
a carrying member shaped for engagement with a main overhead support,
an upper block rigidly attachable to the top of the apparatus to be suspended,
said block having a transverse slot therein,
a stud depending from said carrying member and extending into said block transversely past the region of said slot,
a polygonal formation on said stud formed of angles between diverging meeting surfaces defining angular displacements at which said carrying member connected relative to the apparatus to be suspended can be changed,
a clip having spaced legs defining therebetween a notch complemental to said formation,
said clip being slidable in said slot into locking engagement embracing said formation substantially load-free of the suspension load imposed by the apparatus when suspended, and
means for removably securing said clip to said block.

3. In a suspension assembly for overhead apparatus,
a carrying member shaped for engagement with a main overhead support,
an upper block rigidly attachable to the top of the apparatus to be suspended,
said block having a transverse slot therein,
a stud depending from said carrying member,
a threaded bushing floating on said stud and freely rotary relatively thereto, said bushing being threadedly engageable with said block in the region of said slot,
a polygonal nut fixedly secured to said stud below said bushing, said nut being formed of angles between diverging meeting surfaces defining angular displacements at which said carrying member connected relative to the apparatus to be suspended can be changed,
a clip having a notch therein complemental to said nut and slidable in said slot into locking engagement embracing said nut substantially load-free of the suspension load imposed by the apparatus when suspended, and
means to removably secure said clip to said block.

4. In a suspension assembly for overhead apparatus,
a carrying member shaped for engagement with a main overhead support,
an upper block rigidly attachable to the top of the apparatus to be suspended,
said block having a transverse slot therein,
a stud depending from said carrying member,
a threaded bushing floating on said stud and freely rotary relatively thereto, said bushing being threadedly engageable with said block in the region of said slot,
a polygonal nut fixedly secured to said stud below said bushing,
a clip removably connectable to said block in locking engagement with said bushing to prevent relative rotation therebetween,
a second clip having a notch therein complemental to said nut and slidable in said slot into locking engagement with said nut, and
means to removably connect said second clip to the first said clip.

5. In a suspension assembly for overhead apparatus,
a carrying member shaped for engagement with a main overhead support,
an upper block rigidly attachable to the top of the apparatus to be suspended,
said block having a transverse slot therein,
a stud depending from said carrying member,
a threaded bushing floating on said stud and freely rotary relatively therto, said bushing being threadedly engageable with said block in the region of said slot,
a polygonal nut fixedly secured to said stud below said bushing,
a polygonal formation on said bushing,
an angular clip having spaced legs defining a notch complemental to said formation to receive the same and prevent relative rotation between the clip and bushing,
a part of said clip extending over and being removably attachable to said block,
a second angular clip having a notch therein complemental to said nut and slidable in said slot into locking engagement with said nut,
a portion of said second clip overlying said part of the first said clip, and
means to removably secure said second clip to the first said clip.

6. In a suspension assembly for overhead apparatus,
a carrying member shaped for engagement with a main overhead support,
an upper block rigidly attachable to the top of the apparatus to be suspended,
said block having a transverse slot therein,
a stud depending from said carrying member,
a threaded bushing floating on said stud and freely rotary relatively thereto, said bushing being threadedly engageable with said block in the region of said slot,
a polygonal nut fixedly secured to said stud below said bushing, bushing locking means to hold said bushing against rotation relatively to said block, a clip having a notch therein complemental to said nut and slidable in said slot into locking engagement with said nut, a part of said clip overlying a part of said bushing locking means, and means to removably secure said clip to said bushing locking means through said overlying parts.

7. In combination, an overhead aparatus having a pillow on the top thereof, a carrying member seated on said pillow and shaped for engagement with a main overhead support, a stud connected to said member to depend therefrom, means to connect said stud with said apparatus in a manner preventing relative rotation therebetween, a polygonal formation in said stud, a clip having a notch complemental to said formation for locking engagement therewith, and means to removably connect said clip to said carrying member.

References Cited

UNITED STATES PATENTS

| | | | |
|---|---|---|---|
| 645,057 | 3/1900 | Ayers et al. | 248—339 X |
| 1,605,187 | 11/1926 | Holt | 294—82 |
| 1,867,574 | 7/1932 | Leman | 294—82 |
| 2,215,431 | 9/1940 | Sloan et al. | 248—339 X |
| 2,486,248 | 10/1949 | Berman | 248—290 |
| 2,672,230 | 3/1954 | Jetzke | 248—341 X |
| 3,244,467 | 4/1966 | Koffler | 248—339 X |

ROY D. FRAZIER, *Primary Examiner.*

R. P. SEITTER, *Assistant Examiner.*